Aug. 21, 1923.
W. B. WIEGAND
RUBBER FOOTWEAR
Filed Nov. 20. 1922
1,465,504
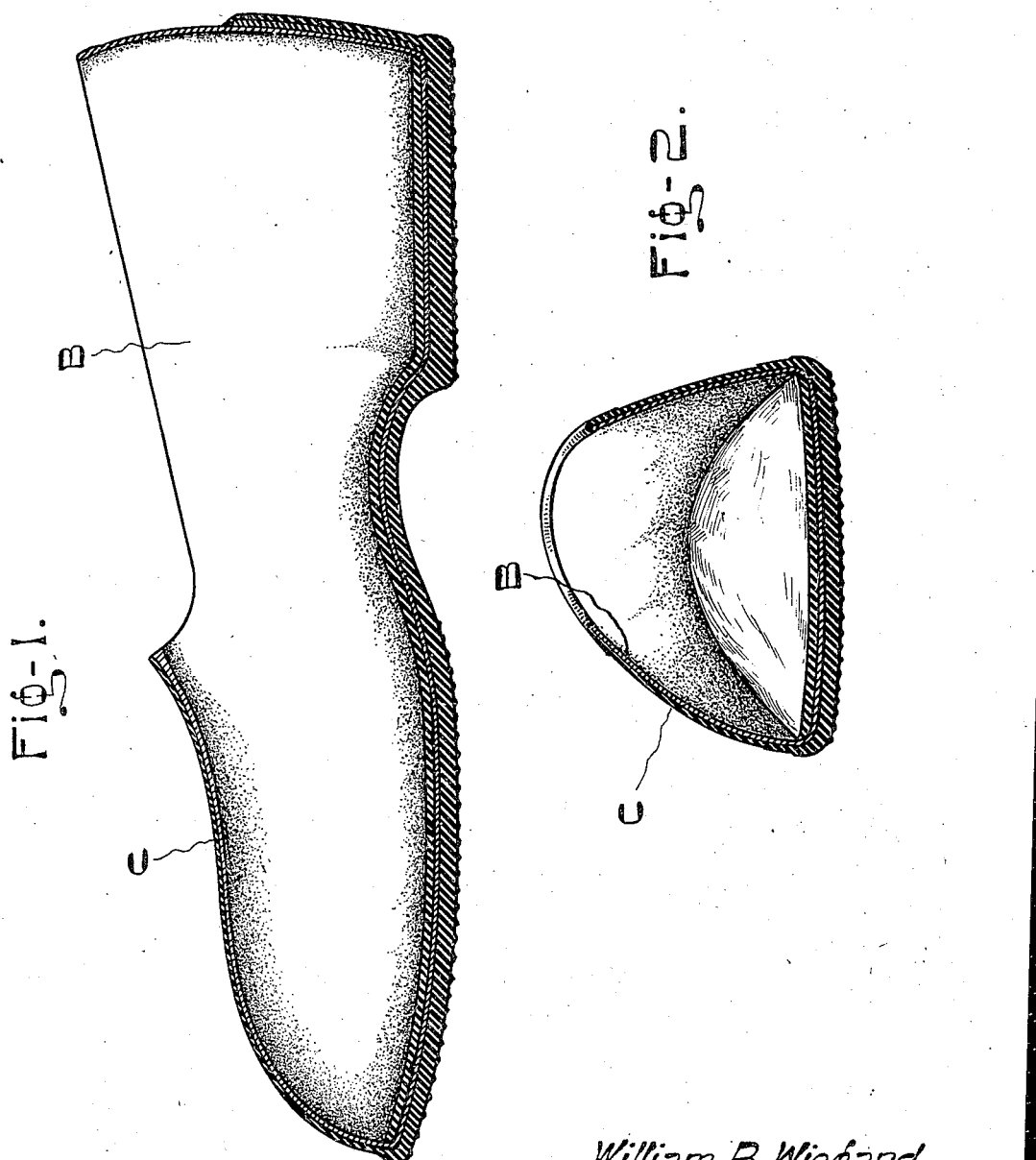
William B. Wiegand,
Inventor.
Attorney.

Patented Aug. 21, 1923.

1,465,504

UNITED STATES PATENT OFFICE.

WILLIAM B. WIEGAND, OF MONTREAL, QUEBEC, CANADA.

RUBBER FOOTWEAR.

Application filed November 20, 1922. Serial No. 602,313.

To all whom it may concern:

Be it known that I, WILLIAM BRYAN WIEGAND, of the city of Montreal, in the Province of Quebec, Dominion of Canada, a subject of the King of Great Britain, have invented certain new and useful Improvements in Rubber Footwear, and I do hereby declare that the following is a full, clear, and exact description thereof.

My invention consists in a new article of rubber manufacture and a process for producing the same.

Briefly, the new article is a composition of vulcanized rubber possessing semi-rigidity combined with great extensibility and tensile strength, together with certain means of achieving this combination of properties.

The new article finds a distinctly novel and valuable application in the manufacture of leather-like parts of all sorts, such, for example, as the soles of shoes. Also, it has already found new and important applications, as when used as the lining or inner layer of rubber footwear of all kinds, being in this respect a satisfactory and inexpensive substitute for woven or knitted fabric as commonly used in the art. The new substance is also applicable to divers uses such as travelling bags, flooring, shock absorbers, etc.

The rubber compositions commonly used in the art may be divided into two broad classes; soft rubber compositions on the one hand, such as, for example, are used in rubber bands, hose, overshoes, tire treads, etc.; and hard rubber compositions, also called ebonite, such as are used for battery jars, combs, telephone parts, etc.

Now the former class possess high extensibility with low rigidity, and the latter great rigidity accompanied by very low extensibility. These limitations confine the usefulness of these two classes of substances to a certain range of applications, as is well-known in the art.

It has for some years been recognized that there was a more urgent need for a third class of rubber compositions, viz; one which might unite the extensibility and therefore immunity from fracture of the former class with the firmness or rigidity of the latter class.

Various attempts have been made to achieve such a composition, chiefly with a view to the production of a so-called imitation leather soling material which might replace leather for use in the outsoles of leather and other footwear.

The results of all these attempts have been only partially successful. A sufficient degree of rigidity has, it is true, been frequently achieved, but in every case there has been so serious a sacrifice in extensibility and also in strength as to incur the danger of early failure due to cracking, chipping, or to what is in the art termed "bad aging quality."

In order clearly to define the class of rubber compositions which is contemplated in this invention, I shall indicate the scope of the various physical properties which I have successfully produced and which I verily believe to constitute a distinctly novel invention.

The semi-rigidity to which I have referred may be defined as a degree of stiffness or resistance to deformation such that to stretch a piece of the vulcanized product to twice its original length requires a force equal to form say 670 to 1600 lbs. per square inch of original cross section. This degree of rigidity embodies the requisite "feel" and stiffness desired in a composition designed for use for example, as a leather-like sole for a shoe.

Now my invention contemplates a product or composition which in addition to displaying the above-mentioned degree of rigidity or stiffness, is nevertheless capable of being stretched to four, five or even six times its original length before rupturing, and also develops when stressed to rupture a final tensile strength ranging from 3500 to 4500 lbs. per square inch of original cross section.

This high extensibility combined with high final (or breaking) strength, ensures for this composition a resistance to wear and tear, and a freedom from premature failure which I believe to be new and hitherto unattained in the art.

I repeat that in the art there have been produced rubber compositions exhibiting the degree of rigidity described above, but these compositions have lacked the degree of strength and extensibility indicated in the specific examples referred to, and I shall now describe the means used in the past and the new process constituting my invention.

In the present art this increased rigidity has been secured through the admixture with the rubber of coarse, fibrous matter of various kinds. In most cases ground cotton or wool waste has been used for this purpose. In other cases ground leather or cork has been chosen. In still other cases substances such as china clay have been used, in this case the well known fibrous or acicular character of the crystals being the agency through which the desired rigidity is obtained.

Now my invention contemplates a totally distinct and different means of securing the desired rigidity and combining with it the new properties of strength and extensibility.

I choose the very finest and least fibrous materials known to the art, and admix these in definite proportions with the rubber and vulcanizing agents which are always used to ensure a satisfactory degree of vulcanization.

These agents are by no means new in the art. The most approved ones I have so far used are for example, carbon gas black and lampblack. These chemicals are in daily use in the art as coloring and strengthening ingredients in the manufacture of soft rubber goods referred to above.

As a typical case I add to each 100 parts by weight of crude rubber, 80 parts by weight of carbon or gas black and a sufficient quantity of sulphur and litharge to achieve the desired degree of vulcanization of the product. This when vulcanized produces a product combining relatively high rigidity with high extensibility and breaking strength.

I may use only 60 parts or I may use 100 parts and secure in each case, in varying proportion, the qualities desired.

In some cases I use combinations of carbon or lampblack with other and coarser fillers such as carbonate of magnesium or zinc oxide, etc. But in each case I use a comparatively high percentage of the highly pulverulent carbon or lampblack.

Rubber footwear of all kinds, including low overshoes as commonly worn over leather footwear, and also heavy boots of all heights as worn over leather footwear, and also heavy boots of all heights as worn over the stocking by miners, farmers, fishermen, etc., may be made according to my invention, the effect being that for the first time an article of rubber footwear consisting integrally of rubber compound throughout is produced.

Heretofore all articles of footwear have been furnished with a woven or knitted fabric lining, made sometimes of cotton, sometimes of wool, sometimes of mixtures of the two; and the common method of manufacturing footwear has been to subject this fabric lining to several rubberizing processes, either by means of a so-called spreading machine or on a calender, after which it is cut to pattern and the various pieces applied by hand in the manner well-known to the art.

The object of my invention is by eliminating this fabric lining and using instead a lining of rubber compound to reduce the difficulty and number of the rubberizing processes referred to above, and so reduce the cost of manufacture. This is also achieved by reason of the fact that rubber compound always costs less than woven or knitted fabric, because of the greater simplicity of its preparation. Again, I achieve a further and important economy by virtue of the fact that whereas the cuttings or waste material left over when the fabric linings have been cut to pattern are, practically speaking, useless, and no longer available for their original purpose, the cuttings left over when the linings are cut from my rubber compound are in a soft and plastic condition, and can be readily worked up and used again, just as if they were a freshly prepared compound.

My invention, broadly stated, is an article of footwear consisting exclusively of rubber compound, but more specifically it consists of an article of footwear made up of two or more compositions of rubber compound, so prepared as to supply an inner shell or, lining of compound, which after vulcanization will be of diminished elasticity as compared with the outer shell of soft rubber compound, such as is now used generally in the art. In particular, I aim at supplying an inner shell of rubber compound which, after vulcanization, shall possess a degree of elasticity practically equivalent to that of the fabric lining now used everywhere in the manufacture of rubber footwear.

For full comprehension, however, of my invention, reference must be had to the accompanying drawings in which similar reference characters indicate the same parts, and wherein:

Figure 1 is a longitudinal section view of a rubber shoe manufactured according to my invention; and Figure 2 is a transverse sectional view thereof.

The body of the shoe indicated at B, is what has now usually a fabric lining. In my invention it consists of a rubber compound so prepared as to impart to it elastic qualities substantially similar to those of the usual fabric lining, and which are less than those characteristic of the usual outer shell of soft rubber, which is indicated at C. This outer shell of waterproof covering of the soft rubber compound has a comparatively higher degree of elasticity, and is calendered in the usual way and applied to the relatively stiffer inner shell or body of rubber compound in the manner common everywhere in the art of rubber footwear manufacturing.

Despite these differences in elasticity between the outer shell of soft rubber and the inner shell of more rigid or less elastic rubber, the two are nevertheless compounded with the same basic material, and so upon vulcanization fuse together into an inseparable whole, being in this way totally distinct and superior to the existing type of rubber footwear, which by virtue of the relatively incomplete fusion of the fabric lining with the rubber outer shell, are liable to separate and so fail prematurely when subjected to the wear and tear of actual usage The inner shell of more rigid rubber, which is an essential feature of my invention, may be prepared in any of the ways common to the art of rubber compounding. Thus, for example, I may secure the enhanced rigidity by suitable choice of vulcanizing ingredients, thereby advancing the rubber to a higher degree of vulcanization. Again, I may incorporate into the rubber a suitable proportion of finely divided pigment or other pulverulent substances, which as well known, have the effect of reducing the elasticity of the compound. Again, I have achieved the desired degree of rigidity by admixing with the rubber various percentages of finely ground cotton or woolen fibre, such as is commonly sold as a by-product of textile factories. In any of these cases I am enabled to diminish the excessive stretch of elasticity of the rubber and so make it similar in behaviour to the more or less rigid fabric lining now universally used in the manufacture of rubber footwear.

However, of all means above mentioned for securing a degree of rigidity in the inner shell of rubber compound, I desire specifically to mention as an integral part of my invention the compound consisting of rubber together with the necessary vulcanizing ingredients and the substance known as carbon or lampblack, this being a finely divided pigment consisting essentially of the element carbon. I have discovered that the admixture of a proper proportion of finely divided carbon secures the desired rigidity of the rubber inside shell, and in addition, endows the compound with unique excellence in such important respects as strength, uniformity, density of structure, and lightness of weight.

I do not limit myself to the choice of any particular means for securing the rigidity which in itself constitutes one of the chief features in my invention. Neither do I limit myself to the use of only two different types of rubber compound in the construction of my rubber shoe. To meet certain requirements a compound of a third and still higher degree of rigidity may be used in connection with certain parts of my shoe, as for example, in the toe and counter regions within the broad conception of my invention.

In conclusion I would say that the novel effects which I have secured are due to the use of high percentages of these pigments calculated to the amount of crude rubber present. I do not limit myself to the two substances known as carbon and lampblack, because any other very finely divided substance or substances may be employed without departing from the spirit of my invention.

Furthermore to meet certain requirements other equally fine or finer pigments may be employed with slightly less or more than the proportions mentioned within the spirit of my invention.

What I claim is as follows:—

1. An article of footwear including sole and upper portions and consisting of an outer layer of comparatively soft rubber, and an inner layer consisting of rubber compound of relatively less elastic quality.

2. An article of footwear consisting of an outer shell or layer of relatively soft rubber compound in contact with a layer of rubber compound possessing substantially the same elasticity as a woven fabric lining.

3. An article of footwear consisting of an outer layer of relatively soft rubber in contact with an inner layer of substantially less elastic rubber compound, the last-mentioned rubber compound containing as an essential ingredient a finely divided pulverulent substance.

4. An article of footwear consisting of an outer layer or layers of relatively soft rubber compound in contact with an inner layer of less elastic rubber compound, the last-mentioned rubber compound containing as an essential ingredient carbon in a finely divided, pulverulent condition.

5. An article of footwear consisting of a layer or layers of relatively soft rubber in contact with a layer of relatively less elastic rubber compound, containing as an essential ingredient between fifty (50) and one hundred (100) parts by weight of finely divided carbon to each one hundred (100) parts by weight of crude rubber in the compound.

In testimony whereof I have signed my name to this specification in the presence of two witnesses.

WILLIAM B. WIEGAND.

Witnesses:
GORDON G. COOKE,
IRENE CLORAN.